US012200433B2

(12) United States Patent
Roggeman et al.

(10) Patent No.: US 12,200,433 B2
(45) Date of Patent: Jan. 14, 2025

(54) LINE SOURCE LOUDSPEAKER DEVICE

(71) Applicants: AED DISTRIBUTION N.V., Willebroek (BE); Glenn George Roggeman, Puurs (BE)

(72) Inventors: Glenn George Roggeman, Puurs (BE); Sabry Olivier H Freh, Gembloux (BE)

(73) Assignee: AED DISTRIBUTION N.V., Willebroek (BE)

(*) Notice: Subject to any disclaimer, the term of this patent is extended or adjusted under 35 U.S.C. 154(b) by 182 days.

(21) Appl. No.: 18/018,203

(22) PCT Filed: Jul. 30, 2021

(86) PCT No.: PCT/IB2021/056969
§ 371 (c)(1),
(2) Date: Jan. 26, 2023

(87) PCT Pub. No.: WO2022/024061
PCT Pub. Date: Feb. 3, 2022

(65) Prior Publication Data

US 2023/0276168 A1 Aug. 31, 2023

(30) Foreign Application Priority Data

Jul. 31, 2020 (BE) .................................. 2020/5555

(51) Int. Cl.
*H04R 1/26* (2006.01)
*H04R 1/32* (2006.01)

(52) U.S. Cl.
CPC ............... *H04R 1/323* (2013.01); *H04R 1/26* (2013.01)

(58) Field of Classification Search
CPC .................................. H04R 1/323; H04R 1/26
See application file for complete search history.

(56) References Cited

U.S. PATENT DOCUMENTS 5,268,538 A * 12/1993 Queen ...................... H04R 1/26 181/155
2002/0014369 A1* 2/2002 Engebretson .......... H04R 1/403 181/148

(Continued)

FOREIGN PATENT DOCUMENTS

WO 0225991 A1 3/2002
WO 2013126203 A1 8/2013

OTHER PUBLICATIONS

International Search Report and Written Opinion, dated Nov. 25, 2021, for Application No. PCT/IB2021/056969, (17 pages).

*Primary Examiner* — Suhan Ni
(74) *Attorney, Agent, or Firm* — KDW Firm PLLC

(57) ABSTRACT

A line source loudspeaker device positionable in a mutually orthogonal first and a second position includes a housing with a first loudspeaker for emitting high frequencies and one or more second loudspeakers for emitting low frequencies. The loudspeakers each include a driver and loudspeaker output. Each driver emits a spherical sound wave. The loudspeaker outputs form a combined loudspeaker output. An acoustic waveguide is provided between the combined loudspeaker output and the first loudspeaker to guide the spherical sound waves emitted by the first loudspeaker over a constant wave path and convert them into a rectangular isophase sound wave which interferes constructively with the sound waves of the second loudspeakers to form a cylindrical sound wave. The acoustic waveguide is rotatable about an axis such that, in the first and second position of the line source loudspeaker device, the cylindrical sound wave propagates only in a horizontal direction.

20 Claims, 11 Drawing Sheets

(56) References Cited

U.S. PATENT DOCUMENTS

| | | | |
|---|---|---|---|
| 2002/0071580 | A1 | 6/2002 | Engebretson et al. |
| 2006/0062402 | A1 | 3/2006 | Heil |
| 2015/0172795 | A1* | 6/2015 | Roberts .................... H04R 1/00 381/98 |
| 2018/0288521 | A1 | 10/2018 | Muscheites et al. |
| 2020/0245061 | A1 | 7/2020 | Desrosiers et al. |

* cited by examiner

LINE SOURCE LOUDSPEAKER DEVICE

This application is a national stage filing under 35 U.S.C. 371 of pending International Application No. PCT/IB2021/056969, filed Jul. 30, 2021, which claims priority to Belgian Patent Application No. 2020/5555, filed Jul. 31, 2020, the entirety of which applications are incorporated by reference herein.

FIELD OF THE INVENTION

The invention relates to a line source loudspeaker device.

BACKGROUND

Concerts, festivals and other shows are musical experiences where dozens to thousands of listeners gather at a notably large location to enjoy a performance by musicians. The music produced by musicians is here usually amplified using Public Address (PA) systems. Depending on the type of performance, different requirements are made of a PA system. A first requirement is quantitative and relates to generation of an adequate sound level. Controlling a sound level at concerts or festivals does not however pose any major problem. A second requirement is quantitative, and more specifically requires the sound produced by the PA system to be clearly audible to all listeners. The PA system typically comprises a plurality of loudspeakers, each emitting a sound wave. The sound waves interfere with each other. Due to the interference, the produced sound is not clearly audible everywhere, often making listeners' experience sub-optimal. In order to prevent interference between different sound sources so-called vertical line arrays of loudspeakers, which emit to the listeners a uniform sound wave which is substantially free of interference, are installed at concerts and festivals. The vertical line arrays are composed of a plurality of mutually coupled line source loudspeakers. Vertical line arrays resolve interference relatively well, but have complex limitations. In addition to the challenge of creating an array length long enough to control lower frequency ranges in a midrange of the line array, line arrays have problems with delivering qualitative sound in areas directly above and below the line array. Existing line arrays are unable to produce the clarity of sound offered by high-quality single driver enclosures or some two- or three-way enclosures. Line arrays can hereby not be used in smaller spaces. The use of line arrays is therefore problematic in a small space or in spaces where the acoustics are not very good. Line arrays are further expensive, whereby they are not selected as readily for smaller performances, such as a recital.

SUMMARY OF THE INVENTION

Embodiments of the invention have the object of providing a line source loudspeaker device which can be applied in a wider context.

For this purpose the invention provides a line source loudspeaker device which can be positioned in a first and a second position, wherein the first position is substantially orthogonal relative to the second position. The line source loudspeaker device comprises a housing which is provided with a first loudspeaker and one or more second loudspeakers, wherein the one or more second loudspeakers are arranged on either side of the first loudspeaker. The first loudspeaker is configured to emit high frequencies and the one or more second loudspeakers are configured to emit low frequencies, wherein the first loudspeaker and the one or more second loudspeakers each comprise a driver and a corresponding loudspeaker output, wherein each driver emits a substantially spherical sound wave and is connected to the corresponding loudspeaker output. The loudspeaker outputs of the first and second loudspeakers together form a combined loudspeaker output of the line source loudspeaker device. The line source loudspeaker device further comprises an acoustic waveguide which is provided between the combined loudspeaker output of the line source loudspeaker device and the first loudspeaker. The acoustic waveguide is configured to guide the sound waves emitted by the first loudspeaker over a constant wave path defined by the acoustic waveguide, such that the initially spherical sound wave can be converted into a substantially rectangular isophase sound wave which interferes constructively with the sound waves of the one or more second loudspeakers so as to form a substantially cylindrical sound wave together. The acoustic waveguide is further rotatable about an axis which is coaxial with the driver of the first loudspeaker, such that, in the first and second position of the line source loudspeaker device, the cylindrical sound wave propagates only in a substantially horizontal direction.

Because the line source loudspeaker device can be positioned according to the first and second position, the line source loudspeaker device can be utilized in a wide context. This allows the line source loudspeaker device to be utilized in the first position in for instance a line array for for instance large-scale concerts, and in the second position as column loudspeaker for for instance smaller performances such as recitals. The acoustic waveguide is further rotatable about an axis so that, in the first and second position, the cylindrical sound wave propagates only in a horizontal direction. In other words, the acoustic waveguide limits a vertical dispersion of the sound wave. In the first position a longitudinal direction of the line source loudspeaker device preferably lies substantially parallel to the horizontal direction. An advantage hereof is based on the insight that a wave front of the cylindrical sound wave which is initially emitted by the line source loudspeaker device extends more widely in the first position than a wave front in the second position. This is advantageous for using the line source loudspeaker device in a line array. In the second position the initial wave front is less wide than in the first position. Because the acoustic waveguide is rotatable and also limits the vertical dispersion of the wave front in the second position, the resulting sound wave can be heard with more clarity in smaller spaces. The line source loudspeaker device thus realizes in both positions an optimal sound quality for different locations and for different purposes. The line source loudspeaker device can thus be utilized for both small-scale performances and for large concerts, for instance in a line array.

The acoustic waveguide preferably comprises an inner reflector and an acoustic waveguide housing, which acoustic waveguide housing surrounds the inner reflector at a distance thereof in order to form a channel, this extending between an acoustic waveguide inlet and an acoustic waveguide outlet, between the acoustic waveguide housing and the inner reflector, wherein the inner reflector and the acoustic waveguide housing are formed such that a propagation time of the sound wave is substantially constant through the acoustic waveguide.

The acoustic waveguide housing preferably comprises an outer wall which is configured to realize substantially the same reflection of the sound waves of the at least one second loudspeaker in each of the first position and the second position. By rotating the acoustic waveguide a wave path for sound waves emitted by the at least one second loudspeaker, particularly when a driver of at least one of the plurality of second loudspeakers is arranged at an angle relative to the first loudspeaker, can differ in the first and second position of the acoustic waveguide. This results in considerable phase and volume differences of the emitted sound waves, which phase and volume differences realize sub-optimal sound characteristics. By configuring the outer wall of the acoustic waveguide housing so that the reflection of the sound waves of the at least one second loudspeaker is substantially the same in both the first position and the second position of the acoustic waveguide the phase and volume differences are almost non-existent. The outer wall further preferably comprises at least a first reflective surface and a second reflective surface which are configured to lie at substantially the same distance from the at least one second loudspeaker in respectively the first position and second position.

The combined loudspeaker output preferably comprises at least at the position of the acoustic waveguide an opening. In this way the acoustic waveguide is easily accessible in order to rotate the acoustic waveguide easily, manually and without the use of tools, without a typical front wall of the line source loudspeaker device having to be removed here.

The first loudspeaker is preferably configured to emit sound waves with a frequency of 500 Hz and higher, preferably of 650 Hz and higher, more preferably of 800 Hz and higher, most preferably of 900 Hz and higher. Tests have shown that when sound waves from 500 Hz are emitted, a problematic sound interference between different loudspeakers results. Because the first loudspeaker is configured to emit sound waves with a frequency higher than 500 Hz, the rotatable acoustic waveguide is thus used in optimal manner. This further results in an improved sound quality for a listener.

The one or more second loudspeakers are further preferably configured to emit sound waves with a frequency of 500 Hz and lower, preferably of 650 Hz and lower, more preferably of 800 Hz and lower, most preferably of 900 Hz and lower.

The line source loudspeaker device further preferably comprises a first mounting system configured to mount the line source loudspeaker device in the first position and a second mounting system configured to mount the line source loudspeaker device in the second position. This allows the line source loudspeaker device to be mounted in advantageous manner in both positions.

The first mounting system is further preferably configured to be coupled to a corresponding mounting system of an adjacent line source loudspeaker device. A plurality of line source loudspeaker devices can hereby be coupled so as to form a line array in advantageous manner.

The line source loudspeaker device still more preferably comprises handles which are arranged on opposite sides of the housing, wherein the second mounting system is formed integrally with one of the handles. Because the handles are arranged on opposite sides of the line source loudspeaker device, a centre of gravity of the line source loudspeaker device is located between the handles, whereby the line source loudspeaker device can be handled, rotated and/or placed in simpler manner by a user. Because the second mounting system is formed integrally with one of the handles, the line source loudspeaker device can further be mounted in simple manner in the second position.

A driver of at least one of the plurality of second loudspeakers is preferably arranged at an angle relative to the first loudspeaker.

The angle is further preferably at least 15°, preferably at least 25°, more preferably at least 350.

The one or more second loudspeakers are preferably arranged in the housing symmetrically relative to a propagation plane of the emitted sound wave. This allows further prevention of mutual interference between the plurality of loudspeakers.

The propagation plane preferably lies substantially in one line with a central axis of the first loudspeaker.

In the first position the line source loudspeaker device is preferably usable in a line array and in the second position the line source loudspeaker device is preferably usable as column loudspeaker.

A second aspect relates to a line array comprising a plurality of line source loudspeakers as described above.

A third aspect relates to the use of a line source loudspeaker as described above as column loudspeaker and/or in a line array.

A fourth aspect relates to a system comprising one or more line source loudspeaker devices as described above and a control unit configured to control each of the one or more line source loudspeaker devices, wherein the control unit comprises a wireless transmitter and each of the one or more line source loudspeaker devices comprises a wireless receiver, such that each of the one or more line source loudspeaker devices can be controlled in wireless manner by the control unit, preferably via a Low Latency Bluetooth Broadcast. The control preferably comprises of at least one of the following, or a combination thereof: controlling the sound level of each line source loudspeaker device, controlling the sound quality, monitoring data, predicting a sound quality at a location in the area surrounding the one or more line source loudspeaker devices, wherein the control unit further comprises a computer-readable storage medium which stores instructions which are configured to have the control unit perform one or more of the following steps: controlling the sound level of each line source loudspeaker device, controlling the sound quality, monitoring data, predicting a sound quality at a location in the area surrounding the one or more line source loudspeaker devices.

BRIEF DESCRIPTION OF THE FIGURES

The above and other advantageous features and objectives of the invention will become more apparent and the invention better understood with reference to the following detailed description when read in combination with the accompanying drawings, in which.

The same or similar elements are designated in the drawings with the same reference numerals.

DETAILED EMBODIMENTS

Figure 1:
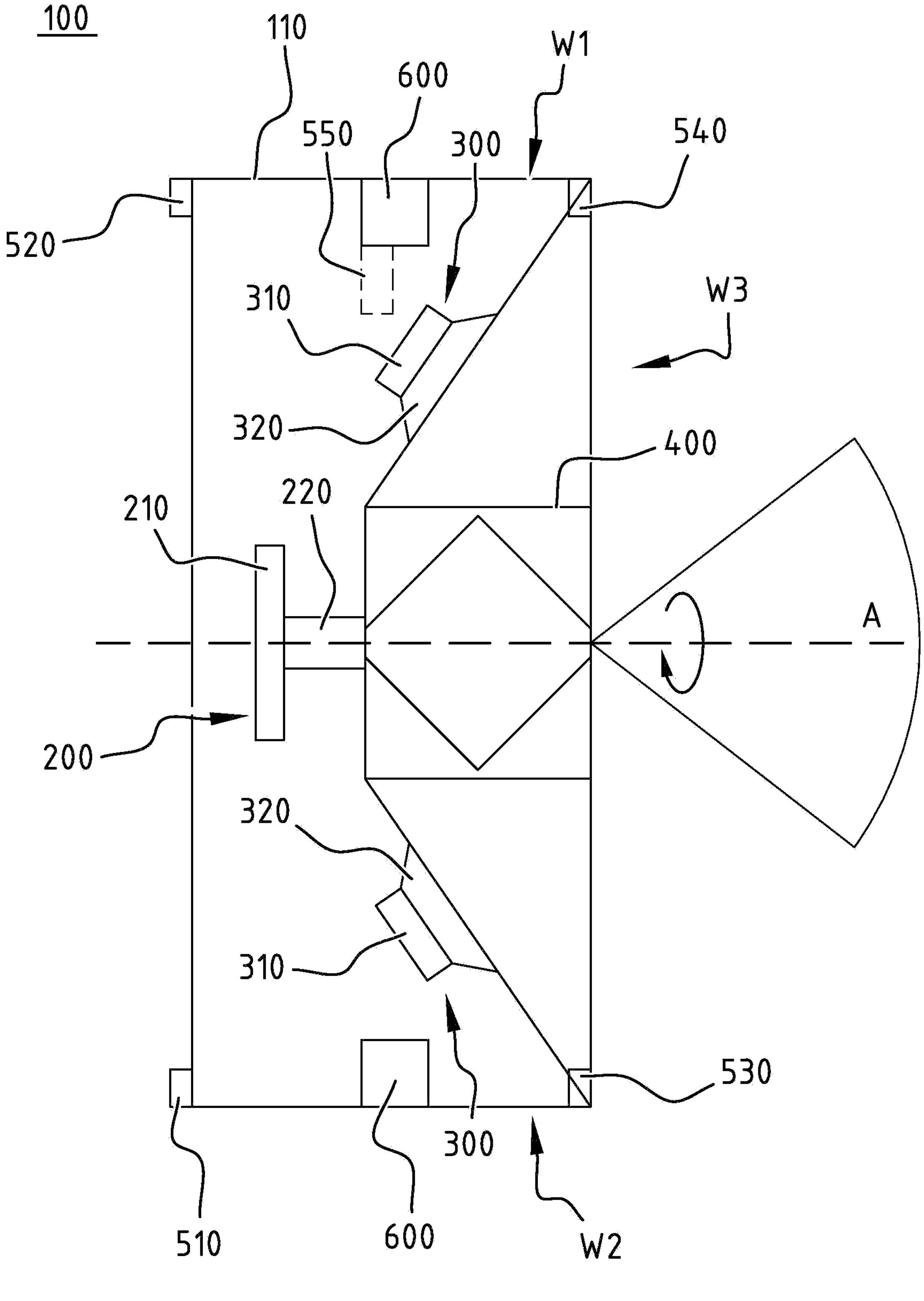
FIG. 1 illustrates schematically an embodiment of a line source loudspeaker device.

The invention will now be further described on the basis of exemplary embodiments shown in the drawings.

FIG. 1 illustrates schematically an exemplary embodiment of a line source loudspeaker device 100. The line source loudspeaker device comprises a housing 110. The housing 110 forms a loudspeaker enclosure configured to emit sound waves from an outlet side W3 of the loudspeaker enclosure.

Housing 110 is provided with a first loudspeaker 200 and one or more loudspeakers 300. The first and second loudspeakers 200, 300 each comprise a respective driver 210, 310 and a respective loudspeaker output 220, 320. The loudspeaker output 220, 320 of the first and second loudspeakers 200, 300 is connected directly to a corresponding driver 210, 310. The drivers 210, 310 are configured to produce sound waves and the loudspeaker output 220, 320 is configured to guide the produced sound waves in a space, for instance to one or more listeners. Drivers 210, 310 are of the point source type. This means that the drivers 210, 310 produce a spherical sound wave. In the context of the application a spherical sound wave is a sound wave which propagates omnidirectionally. This is understood to mean that the sound wave propagates in similar manner in all directions. It will be apparent that this is a theoretical approach and that, in practice, the drivers 210, 310 of the first and second loudspeakers must be deemed approximations of a point source because drivers 210, 310 have finite dimensions, and that the above stated characteristic must be interpreted in nuanced manner. The driver 210, 310 substantially complies here with the inverse square law, wherein a sound pressure level, SPL, of the emitted sound wave decreases in inversely proportional manner to the square of a distance to the driver. Such drivers have already been known for a long time and are typically reliable and inexpensive.

First loudspeaker 200 is preferably arranged centrally relative to the outlet side W3, wherein a respective distance between the driver 210 of first loudspeaker 200 and two mutually opposite housing walls W1, W2, which are situated adjacently of driver 210, is the same. The one or more second loudspeakers 300 are further arranged on either side of first loudspeaker 200. The second loudspeakers 300 are preferably arranged at substantially the same distance from first loudspeaker 200. First and second loudspeakers 200, 300 are thus positioned symmetrically relative to outlet side W3. First loudspeaker 200 and one or more second loudspeakers 300 are arranged such that the respective loudspeaker outputs are directed toward the outlet side of housing 110. In the embodiment illustrated in FIG. 1 the one or more second loudspeakers 300, particularly the drivers 310 thereof, are arranged at an angle relative to the driver of the first loudspeaker 200. The angle between the driver of the first loudspeaker 200 and the drivers of the plurality of second loudspeakers is at least 15°, preferably at least 25°, and more preferably at least 35°. Because the drivers of respectively the first and second loudspeakers are arranged at an angle relative to the driver of first loudspeaker 200, space is saved in the housing, whereby housing 100 is more compact and lighter.

Line source loudspeaker device 100 further comprises an acoustic waveguide 400. Acoustic waveguide 400 is provided between the outlet side W3 and first loudspeaker 200. The acoustic waveguide is particularly provided between loudspeaker output 220 of first loudspeaker 200 and the combined loudspeaker output of the line source loudspeaker device 100. The acoustic waveguide 400 is configured to guide sound waves produced by first loudspeaker 200 over a constant wave path such that the initially spherical sound wave can be converted into a substantially rectangular isophase sound wave which interferes constructively with the sound waves of second loudspeakers 300 in order to thus together form a substantially cylindrical sound wave. In other words, a dispersion of the sound waves generated by first loudspeaker 200 is limited in a height direction or, in other words, substantially vertical direction. The inverse square law states that, in the case of a point source in a free field, a doubling of the distance from the point source reduces the sound level by 6 decibels (dB). The inverse square law no longer applies due to the limitation of the sound wave in a substantially vertical direction. Theoretically, the line source loudspeaker device thus has a sound level reduction of only 3 dB. The wave path is defined by the acoustic waveguide 400. The wave path is for instance formed by a channel extending through acoustic waveguide 400. Acoustic waveguide 400 is rotatable about an axis A which is coaxial with the driver 210 of first loudspeaker 200. This allows the orientation of the rectangular isophase sound wave to be changed.

Figure 2A:
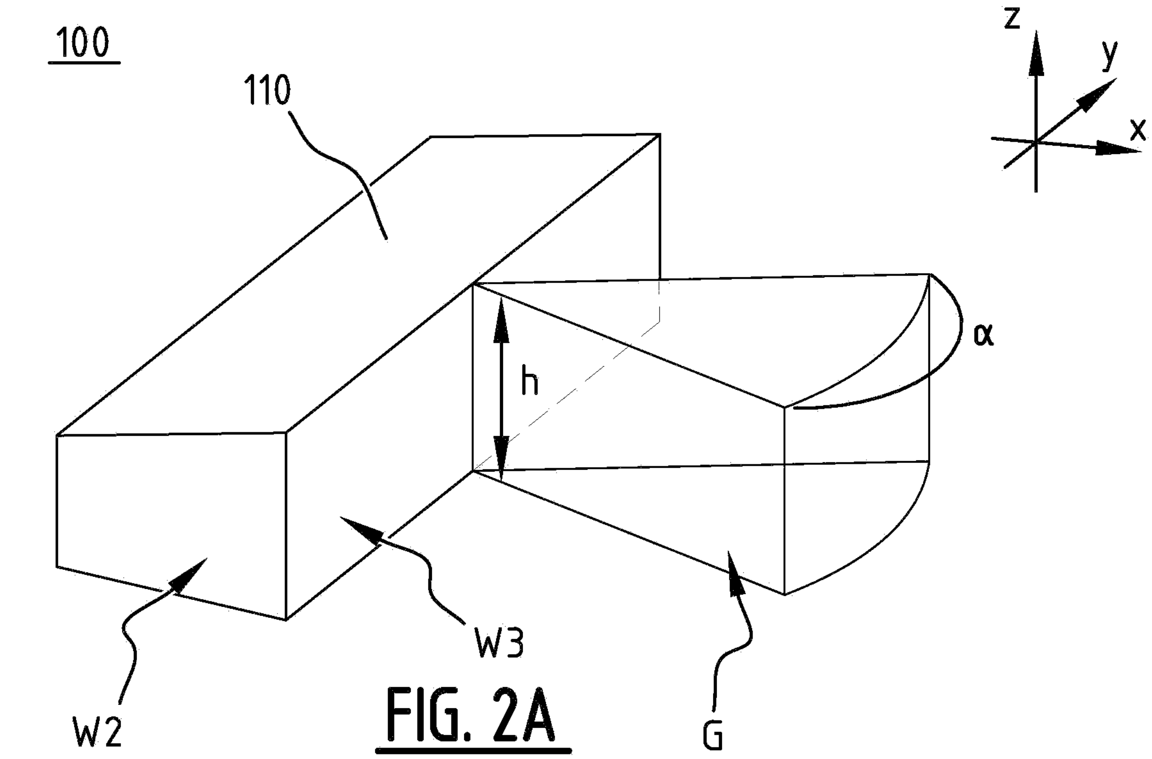
FIGS. 2A and 2B illustrate schematically the line source loudspeaker device in a first and a second position.
Figure 2B:
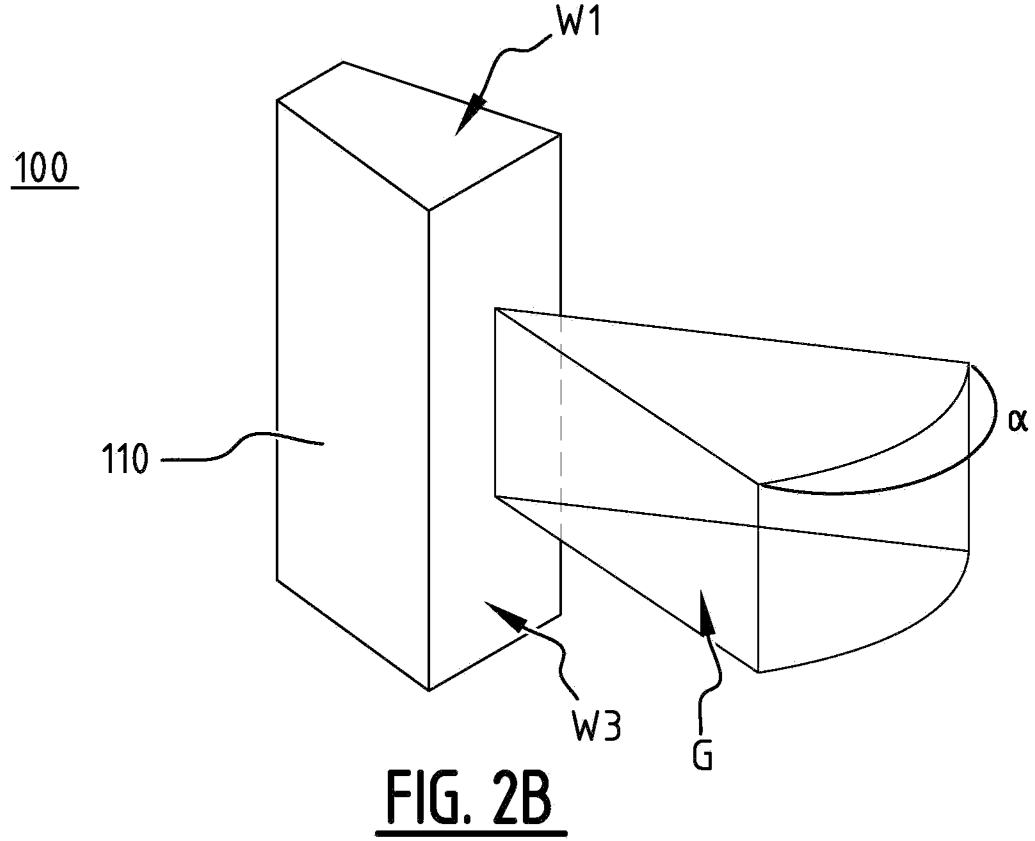

FIGS. 2A and 2B illustrate that the line source loudspeaker device 100 can be positioned in a first position and a second position. In FIG. 2A the line source loudspeaker device 100 is positioned in the first position. In FIG. 2B the line source loudspeaker device 100 is positioned in the second position. The second position is substantially orthogonal relative to the first position. FIGS. 2A and 2B illustrate particularly that the acoustic waveguide emits a rectangular isophase sound wave G. In the first position the line source loudspeaker device has a lying orientation and in the second position the line source loudspeaker device has a standing orientation. In the first position the line source loudspeaker device can be connected to an adjacent line source loudspeaker device in order to form a line array. In the second position the line source loudspeaker device 100 can be used as column loudspeaker. As described above, acoustic waveguide 400 limits the dispersion of the sound waves emitted by first loudspeaker 200. In FIGS. 2A and 2B it is apparent that the upright or substantially vertical dispersion of the sound wave G is limited to a height h which corresponds to a dimension of the outlet side W3 of the line source loudspeaker device. When the line source loudspeaker device is moved from the first position into the second position, acoustic waveguide 400 is rotatable about an axis A which is coaxial with the driver of the first loudspeaker. This allows the orientation, e.g. lying or upright, of the substantially rectangular isophase sound wave to be changed such that, in the first and second position of the line source loudspeaker device 100, the cylindrical sound wave propagates only in a substantially horizontal direction. The horizontal direction is defined relative to the housing. In the illustrated embodiment of FIG. 2A the substantially horizontal direction extends parallel to a longitudinal direction of the line source loudspeaker device and at right angles to the outlet side W3. In FIG. 2B the substantially horizontal direction lies at right angles to both the longitudinal direction of the line source loudspeaker device and the outlet side W3.

FIGS. 2A and 2B further illustrate that the housing 110 is preferably elongate, wherein the outlet side W3 is substantially parallel to a longitudinal direction of housing 110. As seen in a direction transversely of the longitudinal direction, housing 110 preferably has a trapezoidal peripheral shape. The peripheral shape of housing 110 is further preferably an isosceles trapezoid, as seen in the transverse direction, wherein the outlet side forms a large base of the trapezoid and wherein a rear side lying opposite the outlet side forms the small base. This allows sound waves to be guided to outlet side W3 in efficient manner.

Figure 3:
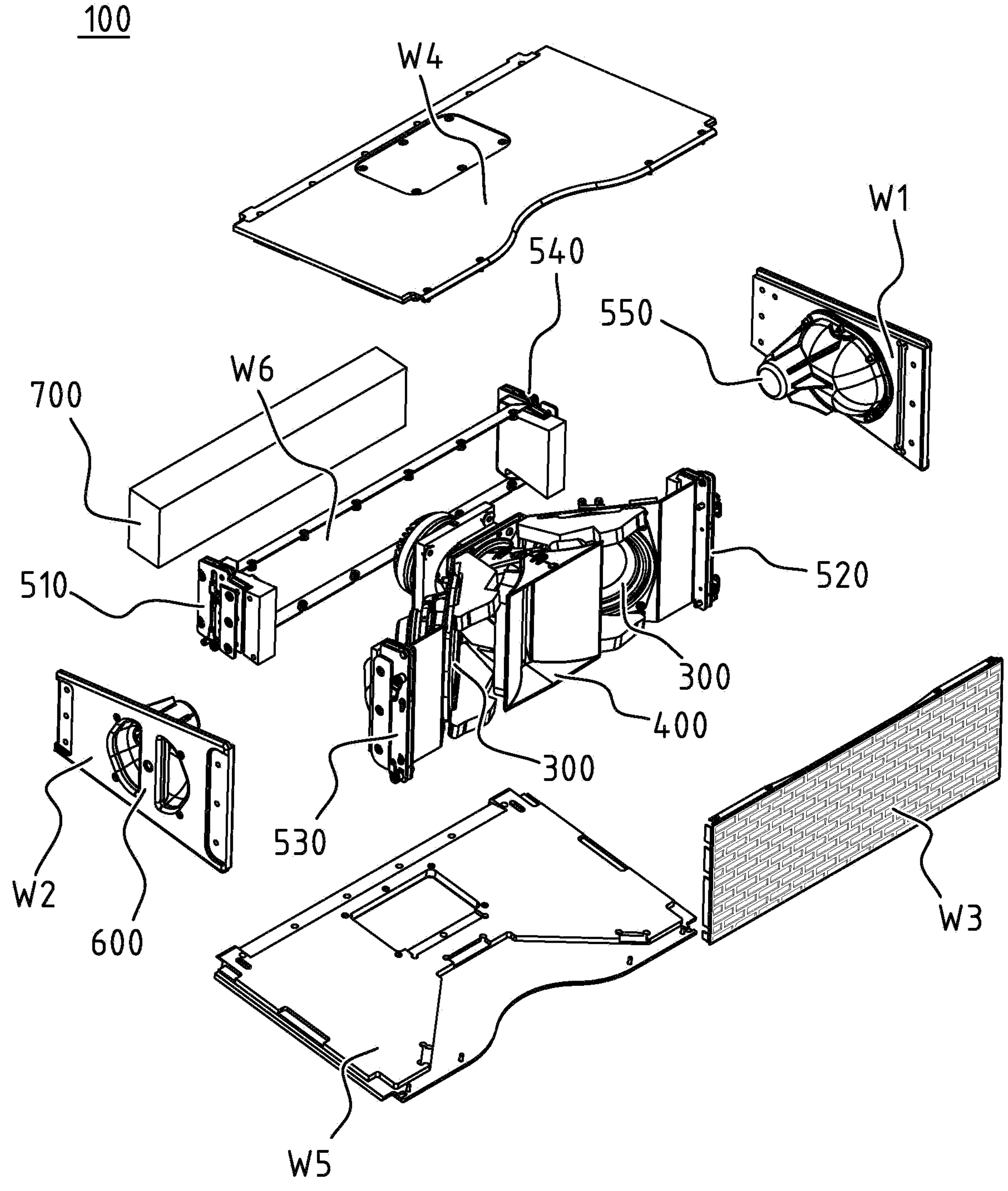
FIG. 3 illustrates an exploded view of a further embodiment of a line source loudspeaker device.

FIG. 3 illustrates an exploded view of the line source loudspeaker device 100. As described above, the line source loudspeaker device 100 comprises a first loudspeaker 200 and one or more second loudspeakers 300. Line source loudspeaker device 100 comprises a housing 110 which is formed by six sides W1, W2, W3, W4, W5 and W6. The housing comprises particularly two lateral sides W1, W2, an upper side W4, an underside W5, an outlet side W3 and a rear side W6. Line source loudspeaker device 100 has on the outlet side W3 thereof a loudspeaker output which is formed by the respective loudspeaker outputs of first loudspeaker 200 and the plurality of second loudspeaker outputs 300.

In the exemplary embodiment the line source loudspeaker device 100 comprises a first mounting system 510, 520, 530 which is configured to mount the line source loudspeaker device in the first position and a second mounting system 550 which is configured to mount the line source loudspeaker device in the second position. The first mounting system 510, 520, 530, 540 is preferably configured to be coupled to a corresponding mounting system of an adjoining line source loudspeaker device. This allows the line source loudspeaker device 100 to be connected to an additional line source loudspeaker device (not shown) at the position of the upper side W4 so that a line array is formed. It will be apparent that an additional line source loudspeaker device can also be connected at the position of the underside W5, or that an additional line source loudspeaker device can simultaneously be connected at the position of upper side W4 and underside W5.

Second mounting system 550 is configured to mount the line source loudspeaker device in the second position. For this purpose the second mounting system 550 is arranged at a position of the first lateral side W1. It will however be apparent that the second mounting system can be arranged at the position of the second lateral side W2 or that second mounting system 550 can be arranged in both the first and the second lateral side. The second mounting system is preferably configured to receive a portion of a loudspeaker stand. For this purpose the second mounting means can be provided with a holder in which a portion of the speaker stand can be received. An advantage hereof is that the line source loudspeaker device can be coupled to a speaker stand without the use of tools. The holder is configured to surround a support rod of a speaker stand. The holder preferably bounds a space in which the support rod can be received. The space is further preferably cylindrical.

The line source loudspeaker device 100 comprises two or more handles 600 which are arranged on opposite sides W1, W2 of housing 110, preferably on the two lateral sides W1, W2 of housing 110. In such an exemplary embodiment the second mounting system 550 is formed integrally with one of the handles 600. This further simplifies the convenience of use and makes the line source loudspeaker device more compact.

FIG. 3 further illustrates that a control device 700 can preferably be arranged on the rear side W6 of the line source loudspeaker device 100. Control device 700 is configured to control the first loudspeaker and the one or more second loudspeakers.

Figure 4:
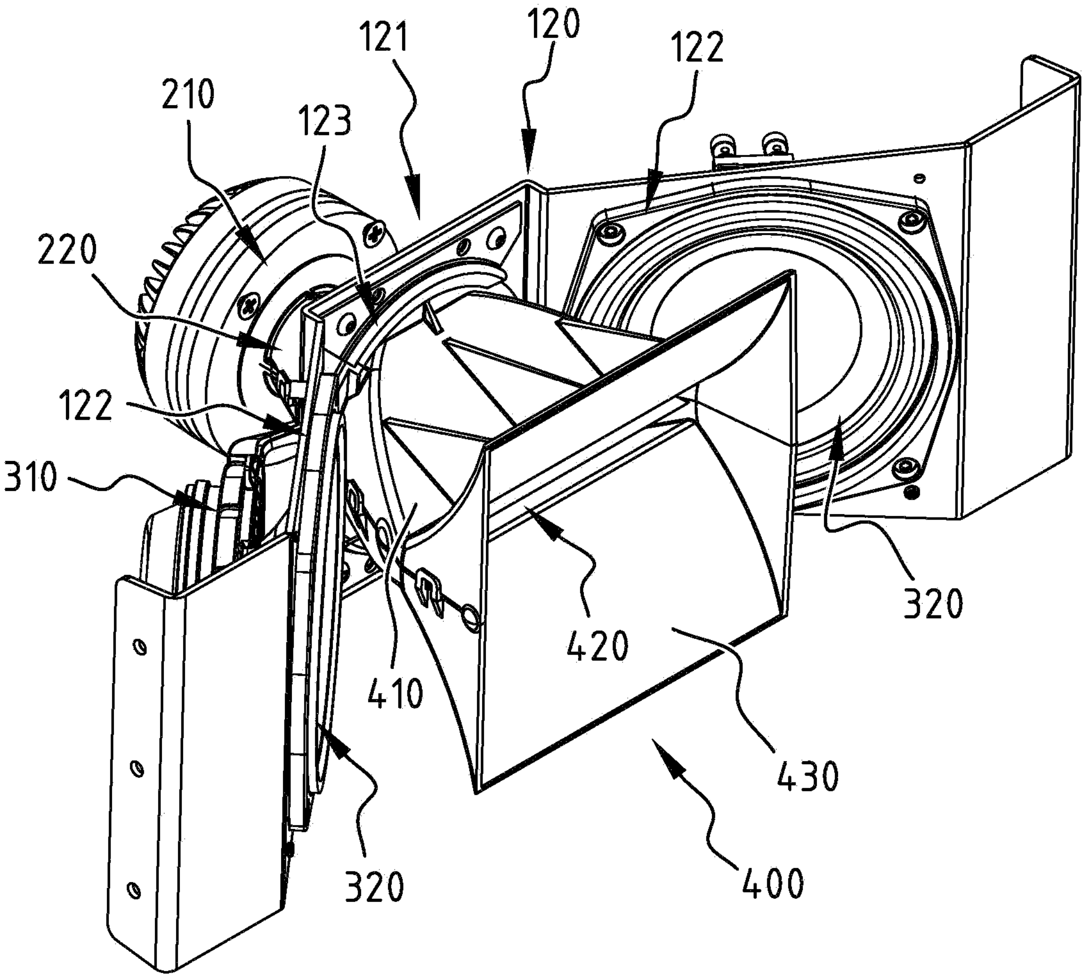
FIG. 4 illustrates a perspective view of the first and the second loudspeakers.

FIG. 4 illustrates a perspective detail view of the first and second loudspeakers 200, 300 of FIG. 3. The first and second loudspeakers 200, 300 are preferably fixed in the housing using a fixing means 120. The fixing means 120 comprises a first fixing part 121 and a plurality of second fixing parts 122. The first loudspeaker is fixing at the position of first fixing part 121. The second loudspeakers are fixing at the position of respective second fixing parts 122. The respective loudspeaker outputs 220, 320 of the first and second loudspeakers are particularly fixed to respectively the first fixing part 121 and the plurality of second fixing parts 122. The acoustic waveguide 400 is connected to the loudspeaker output 220 of the first loudspeaker at the position of the first fixing part. Acoustic waveguide 400 is arranged rotatably on first fixing part 121. For this purpose the first fixing part 121 is provided with a recess 123 and the acoustic waveguide 400 is provided with an edge corresponding with the recess 123. The edge is slidable in recess 123. The recess 123 and the edge describe a circular path. This allows acoustic waveguide 400 to be rotated around an axis (illustrated in FIG. 1).

Acoustic waveguide 400 comprises an acoustic waveguide inlet and an acoustic waveguide outlet 420, wherein the acoustic waveguide inlet is directed toward the loudspeaker output 220 of first loudspeaker 210. Acoustic waveguide outlet 420 comprises a diffuser 430 which is directed toward the loudspeaker output of the line source loudspeaker device. A channel extends between the acoustic waveguide inlet and the acoustic waveguide outlet 420. The channel is formed such that any possible path that a sound wave may follow from the acoustic waveguide inlet to the acoustic waveguide outlet 420 has the same or substantially the same length. The propagation time of the sound wave through acoustic waveguide 400 is hereby constant during operation, and the sound waves are emitted simultaneously at the position of acoustic waveguide outlet 420. Said acoustic waveguide thus enables the spherical isophase sound wave which is generated by the driver of the first loudspeaker to be transformed into a rectangular isophase sound wave.

The acoustic waveguide 400 is further discussed in relation to FIGS. 5, 6, 7 and 8.

Figure 5:
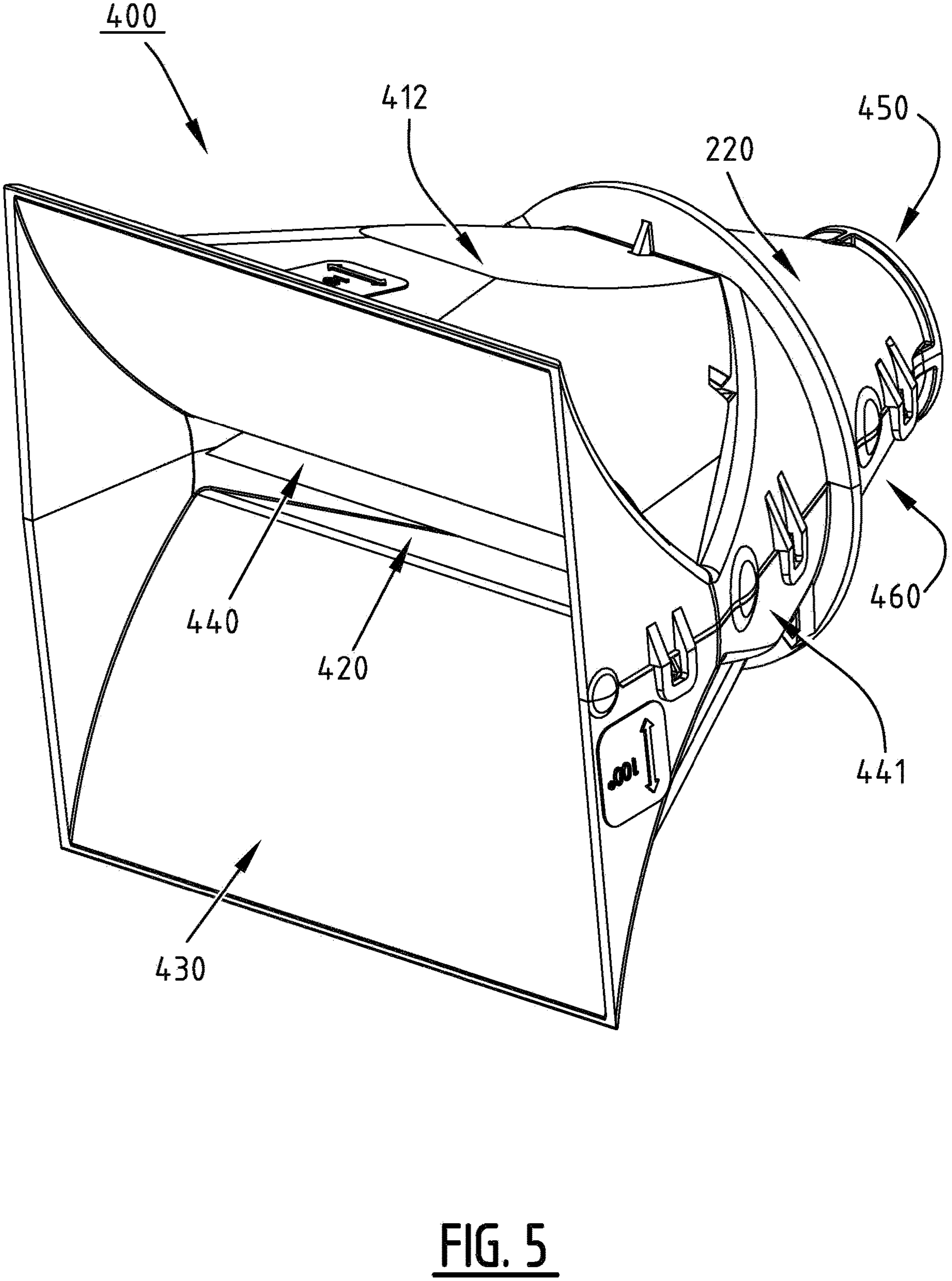
FIG. 5 illustrates a perspective view of an acoustic waveguide according to a preferred embodiment.

FIG. 5 shows a perspective view of an acoustic waveguide according to a preferred embodiment. In the above-described embodiments the first and second position are described in relation to an orientation of the line source loudspeaker device 100. More specifically, it will be apparent by now that in the first position the line source loudspeaker device 100 has a lying orientation, see FIG. 2A, and that, in the second position, the line source loudspeaker device has an upright orientation, see FIG. 2B. The acoustic waveguide is rotated about an axis in corresponding manner so that the cylindrical sound wave propagates only in a substantially horizontal direction in both the first and second position of the line source loudspeaker device 100. More specifically, in the first position of the line source loudspeaker device, the acoustic waveguide has an upright orientation and, in the second position of the line source loudspeaker device, the acoustic waveguide has a lying orientation. In the context of the application the term first and second position may also refer to the position of the acoustic waveguide, although it will be apparent by now that a first and second position of the acoustic waveguide is oriented transversely relative to the first and second position of the line source loudspeaker device.

FIG. 5 shows the acoustic waveguide in the second position in which, as in FIG. 4, the acoustic waveguide has a lying orientation. The preferred embodiment of acoustic waveguide 400 shown in FIG. 4 differs from the embodiment according to FIG. 4 in that the acoustic waveguide housing 410 comprises an outer wall 460 which is configured to realize a substantially identical reflection of the sound waves of the at least one second loudspeaker (not shown) in each of the first position and the second position. For this purpose the outer wall 460 is provided with at least a first reflective surface 411 and a second reflective surface 412. The at least first reflective surface 411 is also visible in FIG. 4. The inventors have found that, when the line source loudspeaker device is in the first position, i.e. lying, and acoustic waveguide 400 thus has an upright orientation, i.e. in the first position of the acoustic waveguide shown in FIG. 3, considerable phase and volume differences of the emitted sound waves are developed, which phase and volume differences realize sub-optimal sound characteristics. Configuring the outer wall 460 of acoustic waveguide housing 410 such that the reflection of the sound waves of the at least one second loudspeaker is substantially the same in both the first position and the second position of the acoustic waveguide renders the phase and volume differences almost non-existent. This situation is further elucidated in relation to FIGS. 8A, 8B and 9, 9A, 9B, 11A and 11B.

According to the illustrated preferred embodiment, the loudspeaker output 220 of the first loudspeaker is formed by the acoustic waveguide housing 410. In other words, loudspeaker output 220 forms a part of acoustic waveguide housing 410.

Figure 6:
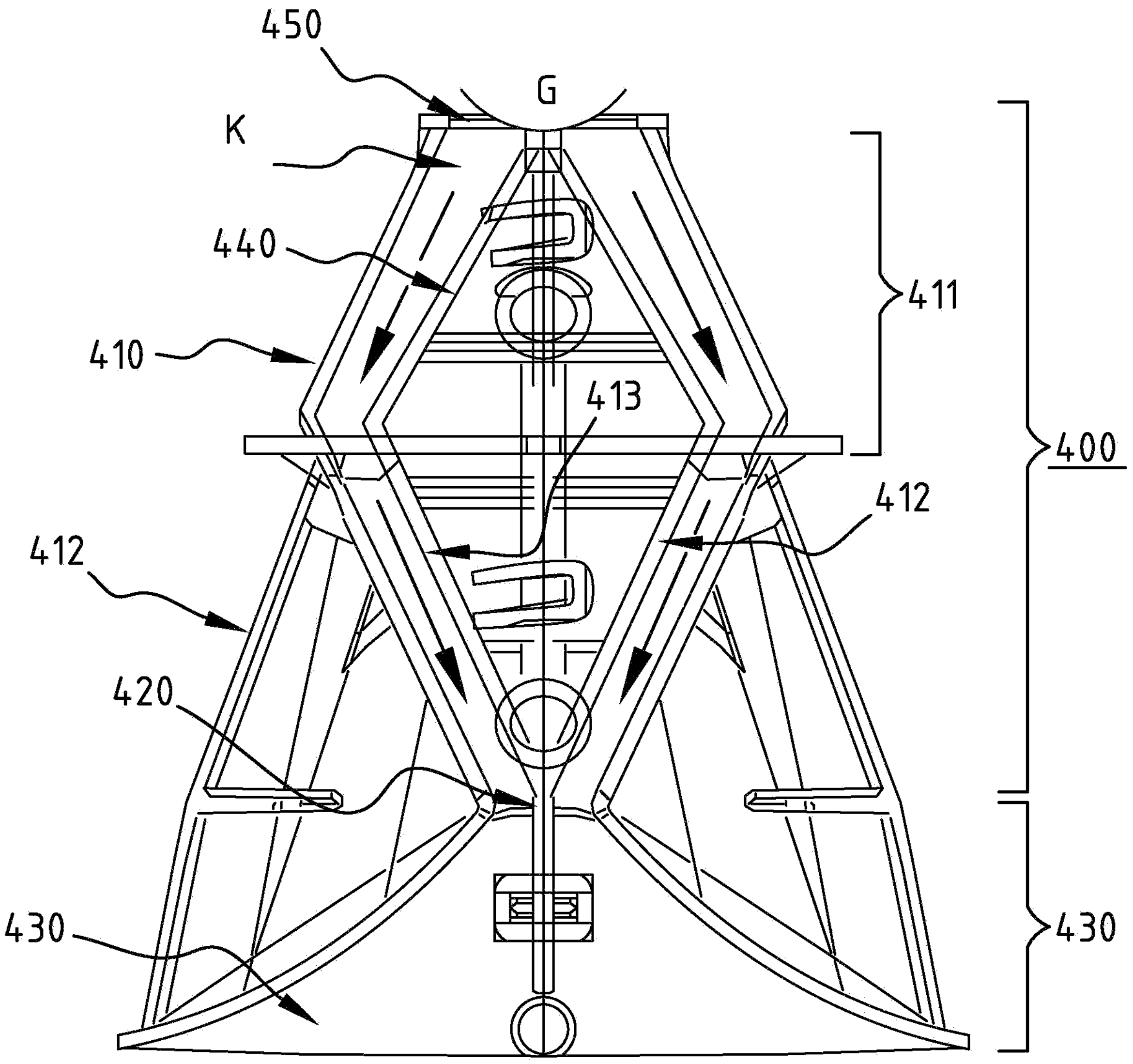
FIG. 6 shows a cross-section of the acoustic waveguide according to FIG. 5, as seen along a direction transversely of the acoustic waveguide outlet.

FIG. 6 shows a cross-section of the acoustic waveguide according to FIG. 5, as seen along a direction transversely of the acoustic waveguide outlet. Acoustic waveguide 400 is illustrated in the first position, i.e. upright.

FIG. 6 shows that acoustic waveguide 400 comprises an acoustic waveguide inlet 450 and an acoustic waveguide outlet 420. The acoustic waveguide inlet 450 is arranged at the position of the driver 210 of the first loudspeaker (not shown). A substantially spherical sound wave G is shown at acoustic waveguide inlet 450.

According to a preferred embodiment, acoustic waveguide 400 comprises an inner reflector 440 and the acoustic waveguide housing 410, which is offset from the inner reflector in order to form a channel. In other words, acoustic waveguide housing 410 surrounds the inner reflector 440 at a distance therefrom, whereby a channel K is formed between acoustic waveguide housing 410 and inner reflector 440. The channel K extends from acoustic waveguide inlet 450 to acoustic waveguide outlet 420. The dimensions of the channel are determined by the acoustic waveguide housing 410 and the inner reflector 440. Inner reflector 440 and acoustic waveguide housing 410 are formed such that a propagation time of the sound wave is substantially constant through the acoustic waveguide. In the preferred embodiment inner reflector 440 is conical 441 on one side, wherein a point of the cone is directed toward acoustic waveguide inlet 450. The cone is further chamfered no further than halfway between the acoustic waveguide inlet 450 and the acoustic waveguide outlet, such that two inclining surfaces 412, 413 are formed, which surfaces intersect each other at the position of acoustic waveguide outlet 420.

Figure 7:
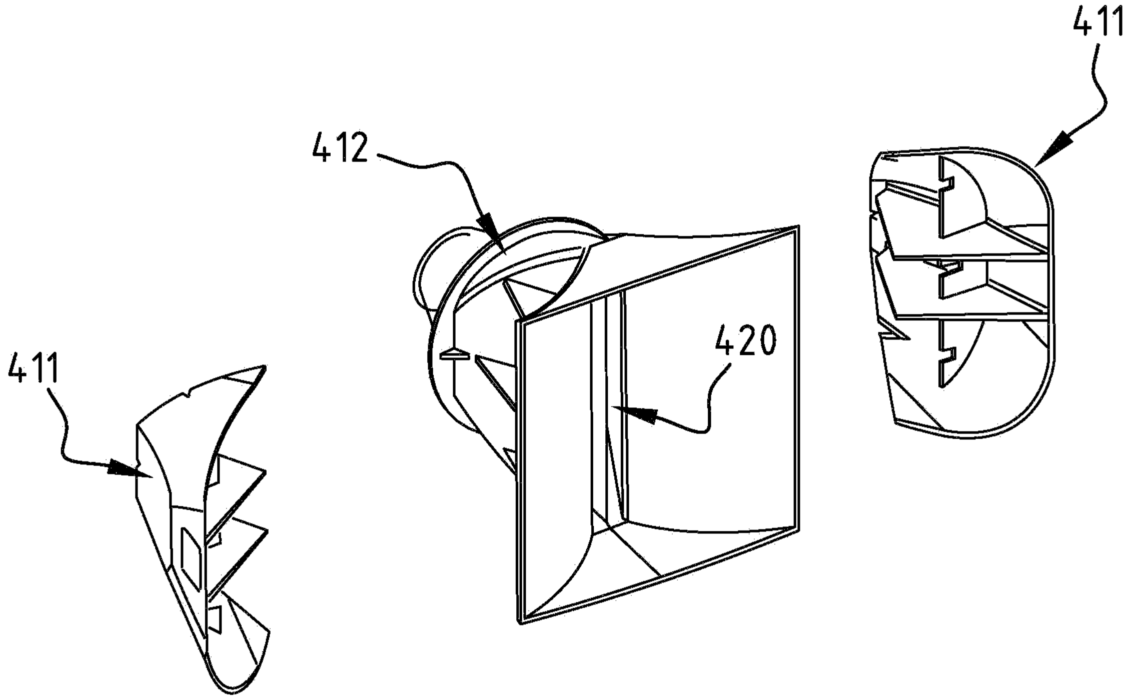
FIG. 7 illustrates an exploded view of an acoustic waveguide according to a further preferred embodiment.

FIG. 7 shows an exploded view of an acoustic waveguide according to a further preferred embodiment. According to this further preferred embodiment, the first reflective surfaces 411 are provided on either side, for instance when two second loudspeakers are arranged in the line source loudspeaker device. According to the illustrated embodiment, reflective surfaces 411 can be arranged removably. This allows reflective surfaces 411 to be exchanged when other second loudspeakers are used or when a different reflection characteristic is desired.

Figure 8A:
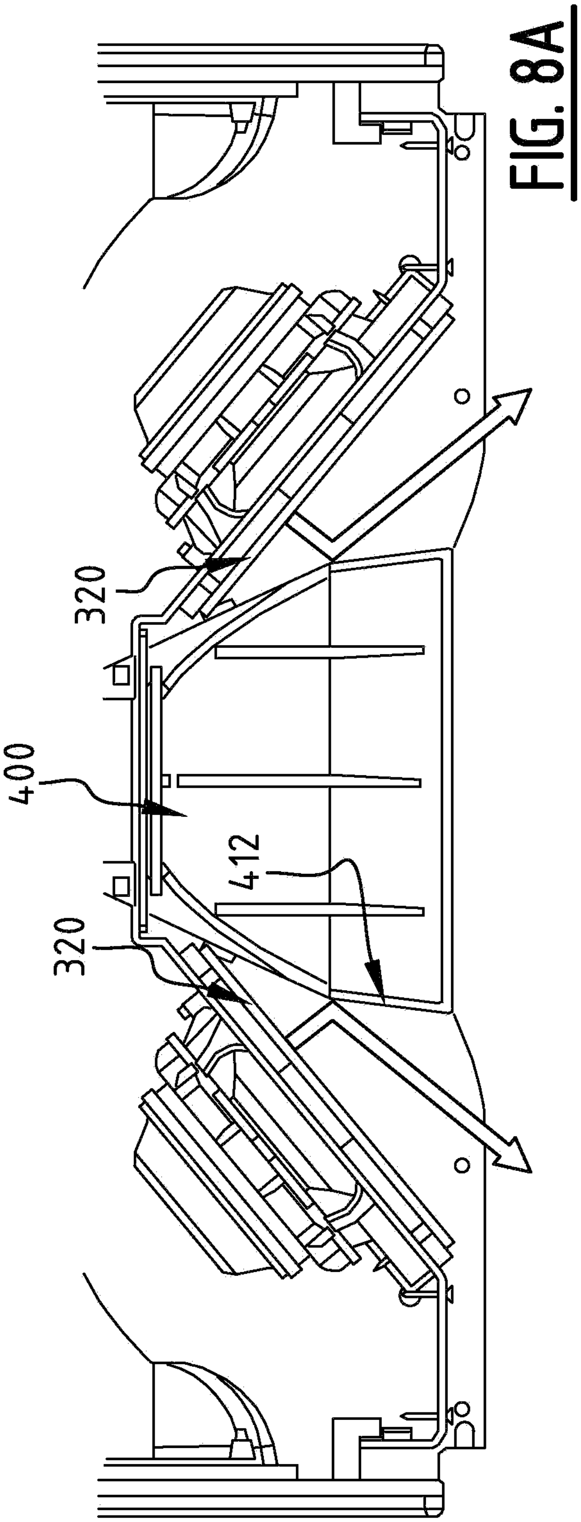
FIGS. 8A and 8B show respectively a top view of the line source loudspeaker device according to FIG. 4 in a first and a second position in which a sound wave reflection of the second loudspeakers is indicated.
Figure 8B:
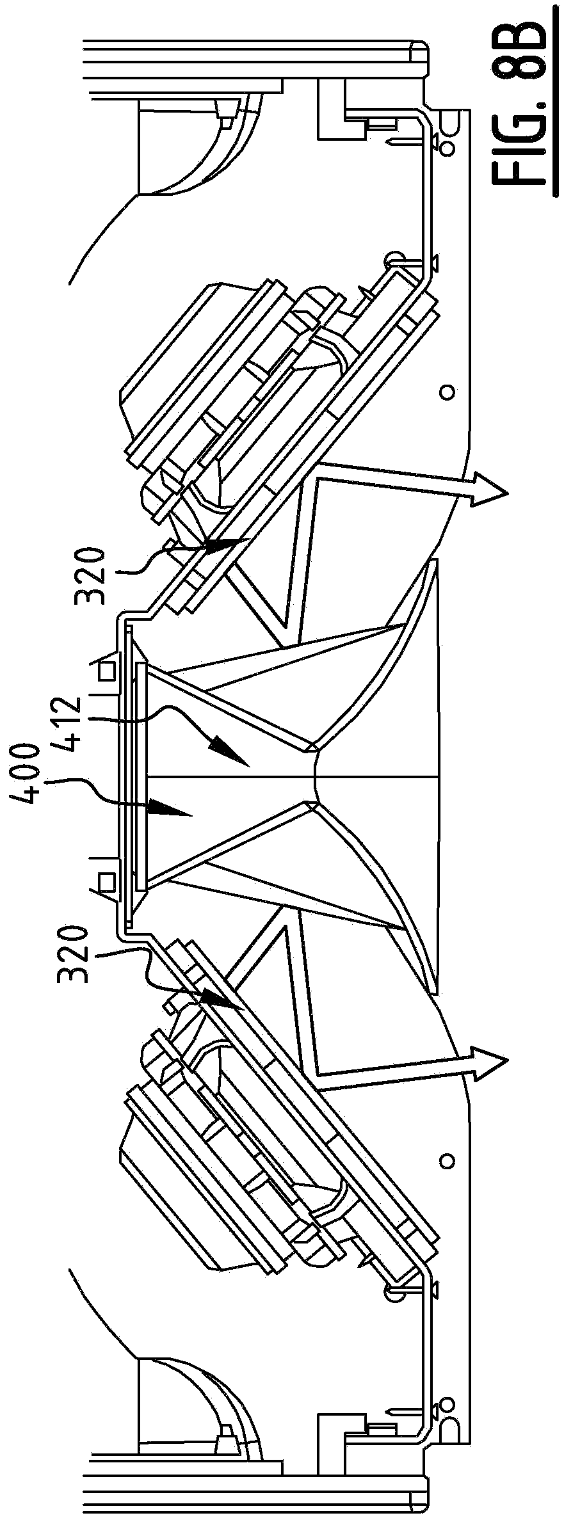
Figure 9A:
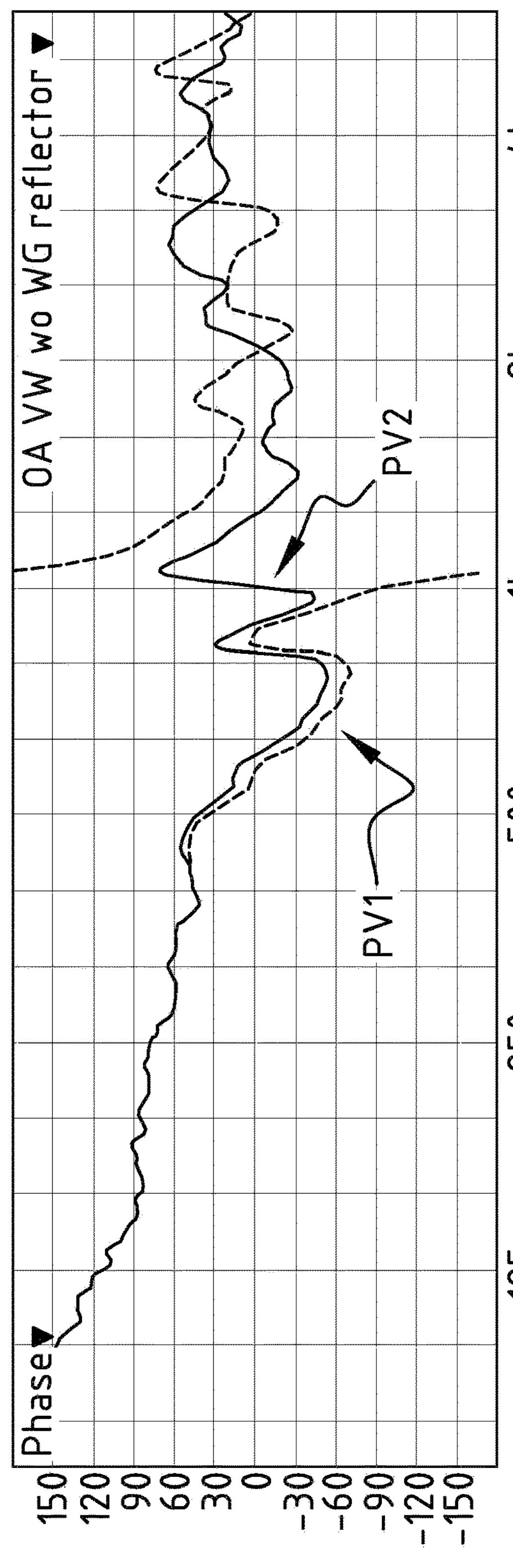
FIGS. 9A and 9B represent acoustic results of the line source loudspeaker device according to FIG. 4 in a first and a second position.
Figure 9B:
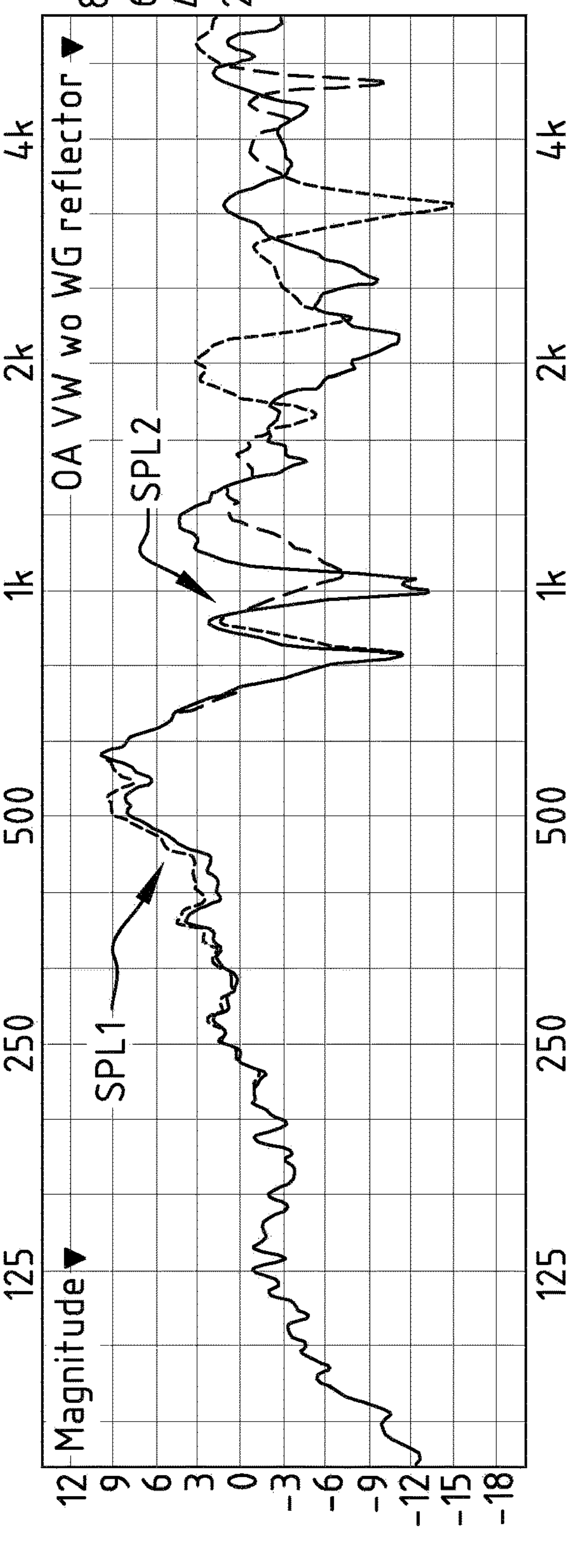

FIGS. 8A and 8B show respectively a top view of the line source loudspeaker device according to FIG. 4, wherein the acoustic waveguide is positioned in a first and a second position. FIG. 8A shows the embodiment according to FIG. 4, wherein the acoustic waveguide is in the lying position. The loudspeaker outputs 320 are directed at least partially toward acoustic waveguide 400 in order to save space in the housing of the line source loudspeaker device. The second loudspeakers emit at the position of their loudspeaker output 320 a sound wave in the direction of the acoustic waveguide, which sound wave is illustrated using the arrow shown in the figure. The emitted sound wave reflects onto the outer wall of the acoustic waveguide housing, more specifically at the position of the second reflective surface 412, in a direction of the combined loudspeaker output. FIG. 8B shows the embodiment according to FIG. 4, wherein the acoustic waveguide is in the upright position. Loudspeaker outputs 320 are directed at least partially toward acoustic waveguide 400 in order to save space in the housing of the line source loudspeaker device. The second loudspeakers emit at the position of their loudspeaker output 320 a sound wave in the direction of the acoustic waveguide, which acoustic waveguide is illustrated using the arrow shown in the figure. The distance between loudspeaker output 320 and the wall of the acoustic waveguide is considerably greater than in FIG. 8A. On one hand, this changes the angle of incidence at which the sound waves are incident on the acoustic waveguide. The emitted sound wave therefore also reflects differently onto the outer wall of the acoustic waveguide housing, more specifically in a direction of the second loudspeakers. The sound waves then once again reflect onto the second loudspeaker output in a direction of the combined loudspeaker output. On the other hand, a greater volume of air is also present between the acoustic waveguide and the second loudspeakers. Such a situation develops considerable phase and volume differences of the emitted sound waves, which phase and volume differences make sub-optimal sound characteristics audible. These phase and volume differences are indicated in FIGS. 9A and 9B. In FIGS. 9A and 9B PV1 indicates the phase of the sound wave which is emitted when the line source loudspeaker device is configured as according to FIG. 8A, i.e. with the acoustic waveguide in the lying position. SPL 1 indicates the sound pressure level (SPL) for an emitted sound wave when the line source loudspeaker device is configured as according to FIG. 8A. In FIGS. 9A and 9B PV2 indicates the phase of the sound wave which is emitted when the line source loudspeaker device is configured as according to FIG. 8B, i.e. with the acoustic waveguide in the upright position. SPL2 represents the sound pressure level (SPL) for an emitted sound wave when the line source loudspeaker device is configured as according to FIG. 8B, i.e. without first reflective surface 111. Clear SPL and phase differences are visible in both situations.

Figure 8C:
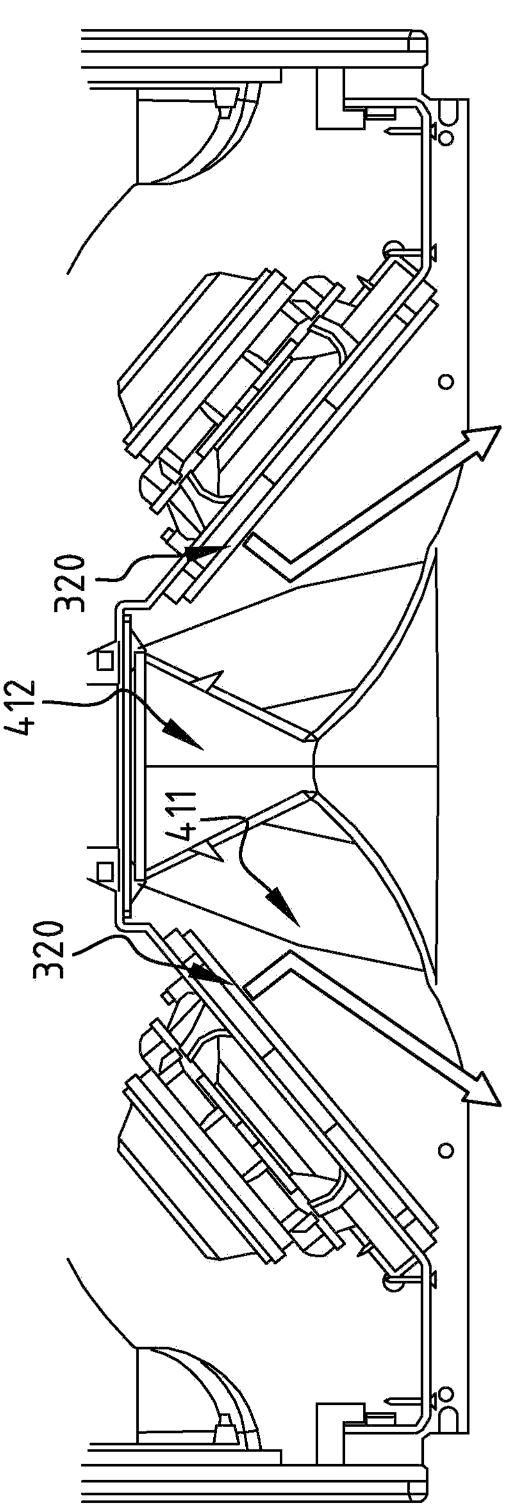
FIG. 8C shows a top view of a line source loudspeaker device with an acoustic waveguide according to FIG. 5.
Figure 10A:
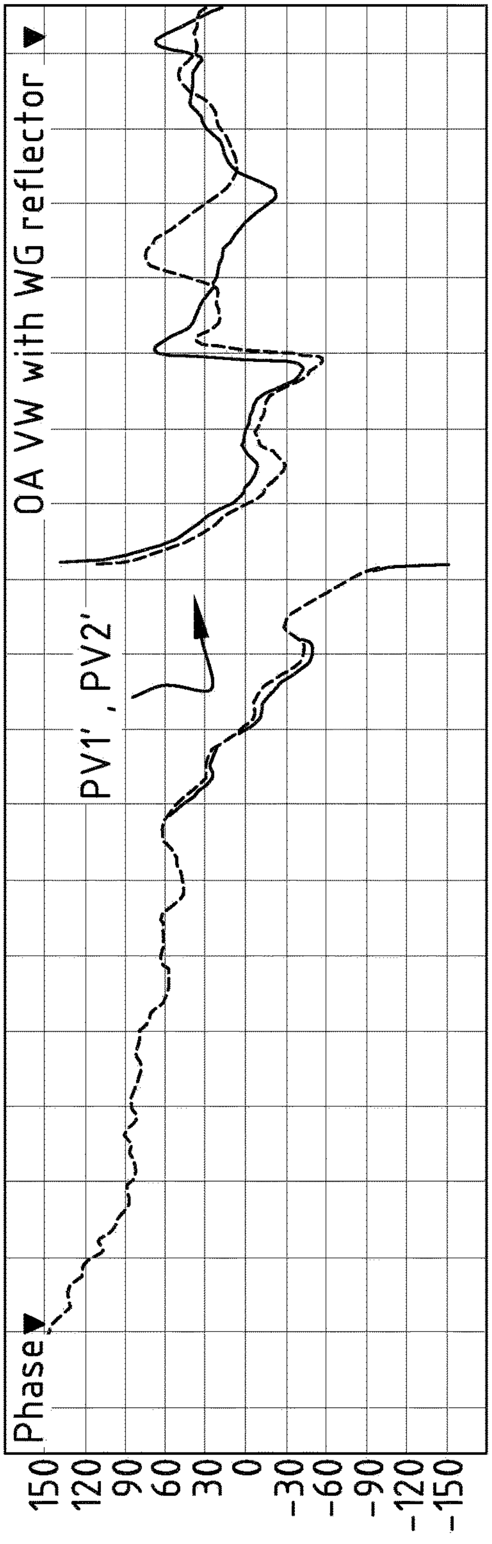
FIGS. 10A and 10B represent acoustic results of the line source loudspeaker device with an acoustic waveguide according to FIG. 5 in a first and a second position.
Figure 10B:
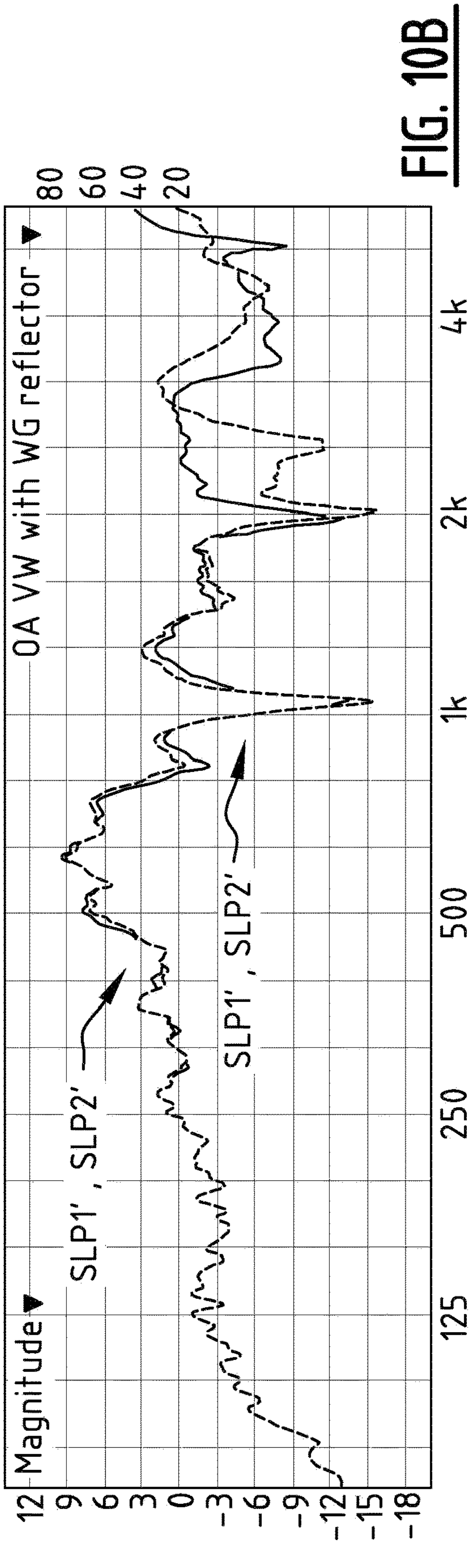

FIG. 8C shows a top view of a line source loudspeaker device with an acoustic waveguide according to FIG. 5, more specifically with a first reflective surface 411. It is noted that in both cases the line source loudspeaker device with a first reflective surface 411 can likewise be positioned as according to FIG. 8A. More specifically, FIG. 8C shows an embodiment wherein the outer wall is configured to realize substantially the same reflection of the sound waves of the at least one second loudspeaker in each of the first position and the second position. The second position is shown in FIG. 8A. It is however clear in FIG. 8C that the outer wall realizes in the first position substantially the same reflection of the sound waves as in the second position. The outer wall more specifically comprises at least a first reflective surface 411 and a second reflective surface 412 which are configured to lie at substantially the same distance from the at least one second loudspeaker in respectively the first position and second position. In this way the volume of air between the second loudspeaker and the acoustic waveguide is substantially the same in both the first and the second position. FIGS. 10A and 10B show the considerably improved phase and volume characteristics of the line source loudspeaker device with an acoustic waveguide with a first reflective surface 411. Compared to FIGS. 9A and 9B, an SPL gain of just under 3 dB is visible when the acoustic waveguide is in the upright position, as shown in FIG. 8C, as compared to the embodiment shown in FIG. 8B. Considerable improvements are also visible between the phase differences at the crossover frequency around 1 kHz. The phase differences have disappeared almost completely.

The skilled person will appreciate on the basis of the above description that the invention can be embodied in different ways and on the basis of different principles. The invention is not limited to the above described embodiments. The above described embodiments and the figures are purely illustrative and serve only to increase understanding of the invention. The invention will not therefore be limited to the embodiments described herein, but is defined in the claims.

The invention claimed is:

1. A line source loudspeaker device which can be positioned in a first and a second position, wherein the first position is substantially orthogonal relative to the second position, the line source loudspeaker device comprising:

a housing which is provided with a first loudspeaker and one or more second loudspeakers, wherein the one or more second loudspeakers are arranged on either side of the first loudspeaker, wherein the first loudspeaker is configured to emit high frequencies and the one or more second loudspeakers are configured to emit low frequencies; wherein the first loudspeaker and the one or more second loudspeakers each comprise a driver and a corresponding loudspeaker output, wherein each driver emits a substantially spherical sound wave and is connected to the corresponding loudspeaker output, wherein the loudspeaker outputs together form a combined loudspeaker output of the line source loudspeaker device, and an acoustic waveguide which is provided between the combined loudspeaker output of the line source loudspeaker device and the first loudspeaker, wherein the acoustic waveguide is configured to guide the sound waves emitted by the first loudspeaker over a constant wave path defined by the acoustic waveguide, such that the initially spherical sound wave is converted into a substantially rectangular isophase sound wave which interferes constructively with the sound waves of the one or more second loudspeakers so as to form a substantially cylindrical sound wave together;

wherein the acoustic waveguide is rotatable about an axis which is coaxial with the driver of the first loudspeaker, such that, in the first and second position of the line source loudspeaker device, the cylindrical sound wave propagates only in a substantially horizontal direction.

2. The line source loudspeaker device according to claim 1, wherein the acoustic waveguide comprises an inner reflector and an acoustic waveguide housing, which acoustic waveguide housing surrounds the inner reflector at a distance thereof in order to form a channel, this channel extending from an acoustic waveguide inlet to an acoustic waveguide outlet, between the acoustic waveguide housing and the inner reflector, wherein the inner reflector and the acoustic waveguide housing are formed such that a propagation time of the sound wave is substantially constant through the acoustic waveguide.

3. The line source loudspeaker device according to claim 1, wherein the acoustic waveguide housing comprises an outer wall which is configured to realize substantially the same reflection of the sound waves of the at least one second loudspeaker in each of the first position and the second position.

4. The line source loudspeaker device according to claim 1, wherein the outer wall comprises at least a first reflective surface and a second reflective surface which are configured to lie at substantially the same distance from the at least one second loudspeaker in respectively the first position and second position.

5. The line source loudspeaker device according to claim 1, wherein the combined loudspeaker output comprises at least at the position of the acoustic waveguide an opening.

6. The line source loudspeaker device according to claim 5, further comprising handles which are arranged on opposite sides of the housing, wherein the second mounting system is formed integrally with one of the handles.

7. The line source loudspeaker device according to claim 1, wherein the first loudspeaker is configured to emit sound waves with a frequency of 500 Hz and higher.

8. The line source loudspeaker device according to claim 7, wherein the one or more second loudspeakers are configured to emit sound waves with a frequency of 500 Hz and lower.

9. The line source loudspeaker device according to claim 1, further comprising a first mounting system configured to mount the line source loudspeaker device in the first position and a second mounting system configured to mount the line source loudspeaker device in the second position.

10. The line source loudspeaker device according to claim 9, wherein the first mounting system is configured to be coupled to a corresponding mounting system of an adjacent line source loudspeaker device.

11. The line source loudspeaker device according to claim 1, wherein a driver of the first loudspeaker is arranged substantially parallel to an outlet side of the housing, wherein the acoustic waveguide extends from the output of the first loudspeaker to the outlet side.

12. The line source loudspeaker device according to claim 1, wherein a driver of at least one of the plurality of second loudspeakers is arranged at an angle relative to the first loudspeaker.

13. The line source loudspeaker device according to claim 12, wherein the angle is at least 15°.

14. The line source loudspeaker device according to claim 1, wherein the one or more second loudspeakers are arranged in the housing symmetrically relative to a propagation plane of the emitted sound wave.

15. The line source loudspeaker device according to claim 14, wherein the propagation plane lies substantially in one line with a central axis of the first loudspeaker.

16. The line source loudspeaker device according to claim 1, wherein in the first position the line source loudspeaker device is usable in a line array and wherein in the second position the line source loudspeaker device is usable as column loudspeaker.

17. A line source loudspeaker device configured to be placed in a first and a second position, wherein the first position is substantially orthogonal relative to the second position, the line source loudspeaker device comprising:

a housing which is provided with a first loudspeaker and one or more second loudspeakers, wherein the one or more second loudspeakers are arranged on either side of the first loudspeaker, wherein the first loudspeaker is configured to emit first frequencies and the one or more second loudspeakers are configured to emit second frequencies, wherein the first frequencies are higher than the second frequencies; wherein the first loudspeaker and the one or more second loudspeakers each comprise a driver and a corresponding loudspeaker output, wherein each driver emits a substantially spherical sound wave and is connected to the corresponding loudspeaker output, wherein the loudspeaker outputs together form a combined loudspeaker output of the line source loudspeaker device, and an acoustic waveguide which is provided between the combined loudspeaker output of the line source loudspeaker device and the first loudspeaker, wherein the acoustic waveguide is configured to guide the sound waves emitted by the first loudspeaker over a constant wave path defined by the acoustic waveguide, such that the initially spherical sound wave is converted into a substantially rectangular isophase sound wave which interferes constructively with the sound waves of the one or more second loudspeakers so as to form a substantially cylindrical sound wave together;

wherein the acoustic waveguide is configured to be rotated about an axis which is coaxial with the driver of the first loudspeaker, such that, in the first and second position of the line source loudspeaker device, the cylindrical sound wave propagates only in a substantially horizontal direction.

18. The line source loudspeaker device according to claim 17, wherein the acoustic waveguide comprises an inner reflector and an acoustic waveguide housing, wherein the acoustic waveguide housing surrounds the inner reflector at a distance thereof in order to form a channel extending from an acoustic waveguide inlet to an acoustic waveguide outlet, between the acoustic waveguide housing and the inner reflector, and wherein the inner reflector and the acoustic waveguide housing are formed such that a propagation time of the sound wave is substantially constant through the acoustic waveguide.

19. The line source loudspeaker according to claim 17, wherein the first loudspeaker is configured to emit sound waves with a first frequency of at least 500 Hz.

20. The line source loudspeaker according to claim 17, wherein the one or more second loudspeakers are configured to emit sound waves with a second frequency of at most 900 Hz.

* * * * *